United States Patent [19]
Jonsson

[11] 3,745,244
[45] July 10, 1973

[54] AUTOMATIC CONTRAST SIGN SELECTOR FOR VIDEO TRACKING

[75] Inventor: Rune Jonsson, Linkoping, Sweden

[73] Assignee: Saab-Scania Aktiebolag, Linkoping, Sweden

[22] Filed: Nov. 10, 1971

[21] Appl. No.: 197,464

[52] U.S. Cl. .......................... 178/6.8, 178/DIG. 21
[51] Int. Cl. .......................................... H04n 7/18
[58] Field of Search ................ 178/68, 7.2, DIG. 21

[56] References Cited

UNITED STATES PATENTS 3,341,643 9/1967 Kruse ................................ 178/6.8

OTHER PUBLICATIONS

Lowenstein–A Television System with Automatic Target Tracking Capability–SMPTE–Dec. 1967, Vol. 76 pp. 1189–1192.

*Primary Examiner*—Robert L. Griffin
*Assistant Examiner*—Joseph A. Orsino, Jr.
*Attorney*—Ira Milton Jones

[57] ABSTRACT

In automatic video tracking employing an electronic window, signals corresponding to a central area of the window that includes the target are analyzed for positive and negative contrast signal content. Only the signal component having the greater signal content is utilized in tracking. The signal analyzing apparatus comprises an integrator, a low pass filter and a comparator. It produces gate signals that pass the selected signal component to window position error circuits and block the other component.

7 Claims, 4 Drawing Figures

Patented July 10, 1973 3,745,244

3 Sheets-Sheet 1

AUTOMATIC CONTRAST SIGN SELECTOR FOR VIDEO TRACKING

This invention relates to automatic video tracking systems such as are used for automatically determining the position of a stationary or moving target in relation to a reference direction or a system of reference axes; and the invention is more particularly concerned with a method and apparatus for improving the accuracy of such tracking by providing for automatic discrimination between a target being tracked and areas of contrast contiguous to the target that are not a part of the target but are influenced by it, such as a shadow cast by the target.

The present invention is closely related to the target tracking system disclosed in the copending application of Stig Erik Ohlsson, for Video Contrasting Tracking Method and Apparatus, filed Nov. 1, 1971, Ser. No. 194,415, which has the same assignee as the present application.

As in the case of visual discovery and tracking of a target, the ease with which an object can be discovered and tracked with a video tracking system depends to a substantial extent upon the contrast between the object and its background. Hence an object of little contrast, or one appearing against a background containing other objects of similar size and luminosity, presents special difficulties for video tracking.

In most prior video tracking systems, and in the one of this invention, an electronic tracking window is defined and is caused to follow the target so that the target is kept centered in the window. In such tracking systems the problem of discriminating the target is encountered because the field surrounding the target (the background) almost invariable includes points or areas of luminosity that can be confused with the target.

In the above mentioned copending application there is disclosed a method of discriminating between the target and the background wherein selected background regions are defined that are vertically and laterally adjacent to the electronic window and are of the same order of magnitude as the electronic window. The video signal corresponding to these background regions is separately analyzed, and a signal corresponding to its mean value is produced. This mean background value signal is in effect subtracted from the video signal that corresponds to the area defined by the electronic window, with the result that a signal is obtained that contains optimized information concerning the area of greatest contrast within the window and thus contains substantially only target information.

Thus the invention disclosed in the aforesaid copending application has for its general object to discriminate between video signals that carry target information and those that carry information relating to the background in which the target appears. The object of the present invention is the more specialized one of so processing the signals that carry target information as to discriminate between the portions of such signals that correspond to the target itself and the portions that correspond to shadows cast by the target or other contrast-producing influences of the target upon its environment.

Such discrimination between the target and its shadows and the like is necessary because contrast tracking systems are responsive to both positive and negative contrast — that is, to both greater and lesser luminosities than the background. Hence automatic tracking apparatus reacts to a shadow or the like that is due to the influence of the target as if it were a part of the target itself, with a consequent decrease in tracking accuracy.

The object of the present invention is thus, in general, to provide a method and means for improving tracking accuracy in cases where the target produces an area or areas of contrast on what is in fact a portion of the background.

More particularly, the present invention has as its object to provide a method and means for so processing video signals that correspond to a selected area within the electronic window as to discriminate between a target and an adjacent area of contrast which is actually a part of the background but is influenced by the target, so that only the portion of such video signals that corresponds to the target itself can be employed for control of the electronic window, while the portions of the video signals that correspond to the thus-influenced background are rejected.

Another object of the present invention is to provide a method and means for accommodating changing contrast of a target as it is being tracked in an automatic video tracking system. Such changing contrast may result from movement of the target across a background of varied character, so that at some times the object is lighter than its immediately surrounding background (positive contrast) and at other times darker than its background. While the human eye has little difficulty in following an object of such changing contrast value, a shifting contrast has heretofore presented a serious problem for automatic tracking, which has resulted in tracking failures.

In general, the invention is premised upon a recognition that contrasts which are due to an influence of the target are of opposite sign to those due to the target itself, and that in a case where the target information video signal contains components of two opposite signs, the component having the greater signal magnitude is most likely to correspond to the target proper. In accommodating both positive and negative contrasts the invention provides for automatic accommodation of changing values of contrast between the target and the background.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which.

Figure 1:
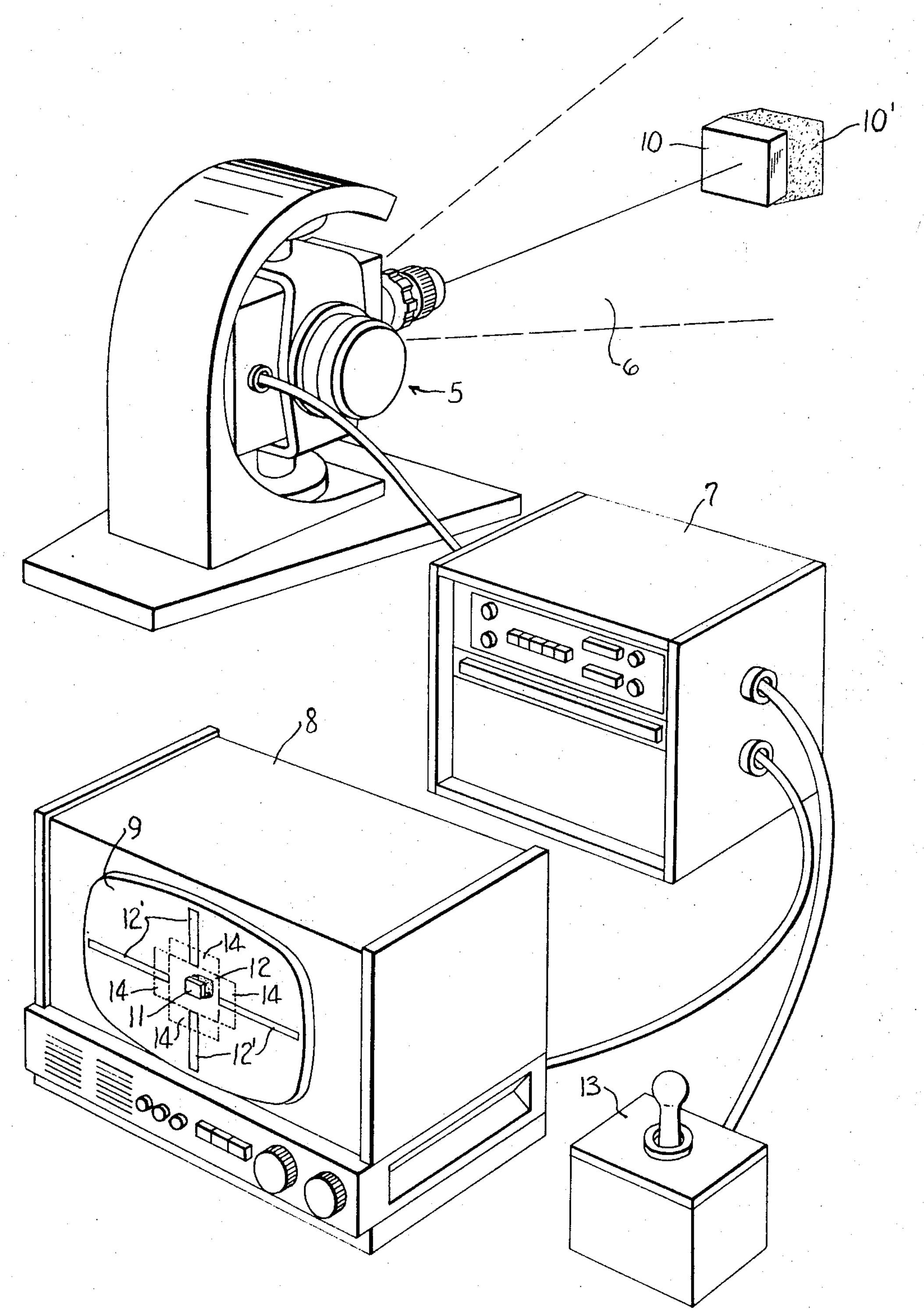
FIG. 1 is a perspective view of the several principal units comprising a video tracking apparatus embodying the principles of this invention.

Referring now more particularly to the accompanying drawings, the numeral 5 designates generally a video camera which has a field of view that is designated by 6, and which scans that field line by line to produce a video signal that constitutes an electrical representation of what is in its field of view. The camera is connected with a video signal processing unit 7 that is described hereinafter, and the signal processing unit is in turn connected with a monitor 8 that has an image screen 9 on which the video signal is caused to produce an image of the field of view being scanned by the camera.

Within the field of view of the camera 5 there is assumed to be an object or target 10 to be tracked, which object, by reason of its luminosity, stands out to a greater or lesser extent against its surrounding background, and casts a shadow 10' that also stands out from the background by reason of its contrast thereto. An image 11 of that object appears on the screen 9 of the monitor. Owing to the action of circuits in the signal processing unit 7, an electronic window 12 corresponding to a selected area within the field of view 6 is defined. The limits of that electronic window are represented on the screen 9 by horizontal and vertical light strips 12' which have their inner ends on the boundaries of the window, and which are arranged in the manner of graticules centered on the window area. The light strips can be generated in a known manner in the signal processing unit.

With the aid of a control unit 13 that is connected to the signal processing unit, the electronic window can be manually adjusted to assume any desired position on the image screen 9. For tracking to be initiated, it is necessary to lock in on the target manually, and this is done by shifting the electronic window with the use of the control unit 13 until the image of the object is seen to be within the limits of the window as depicted on the monitor screen. The object image need not necessarily be centered in the electronic window. The contrast tracking apparatus is then actuated to effect automatic tracking. Assuming that the object has sufficient contrast to its background for locking-in to take place, the tracker will take over the tracking function, and the window will follow the image 11 on the screen 9 to assume and maintain a position such that the object is centered in it.

In the course of tracking, the signal processing unit 7 utilizes the video signals from the camera 5 and processes them to produce signals which correspond to the position of the object 10 in relation to the optical axis of the camera, which signals can be utilized in a known manner to swing the camera in azimuth and elevation to maintain its optical axis centered on the object 10, and to provide information for other purposes related to the tracking mission. As a result of such swinging of the camera, the image 11 of the object, centered in the window defined by the light strips 12'. is caused to appear at the center of the monitor screen 9.

During tracking, the video signals that correspond to the portion of the field of view that is within the electronic window 12 are compared with the signal corresponding to the background in other selected portions 14 of the field of view, and the comparison of the signal for the area inside the window 12 with that for the selected areas 14 outside it is utilized in discriminating the target. All of this is accomplished in the signal processing unit 7, which is here described in only a general way. A more detailed description of the signal processing unit is given in the above identified copending application.

The selected areas 14 outside the window 12 are hereinafter referred to as the background regions. Their positions are fixed in relation to the electronic window. Although illustrated in FIG. 1 for purposes of explanation, the background regions 14 are not actually depicted or denoted on the monitor screen. They are employed only in signal processing within the apparatus.

Figure 2:
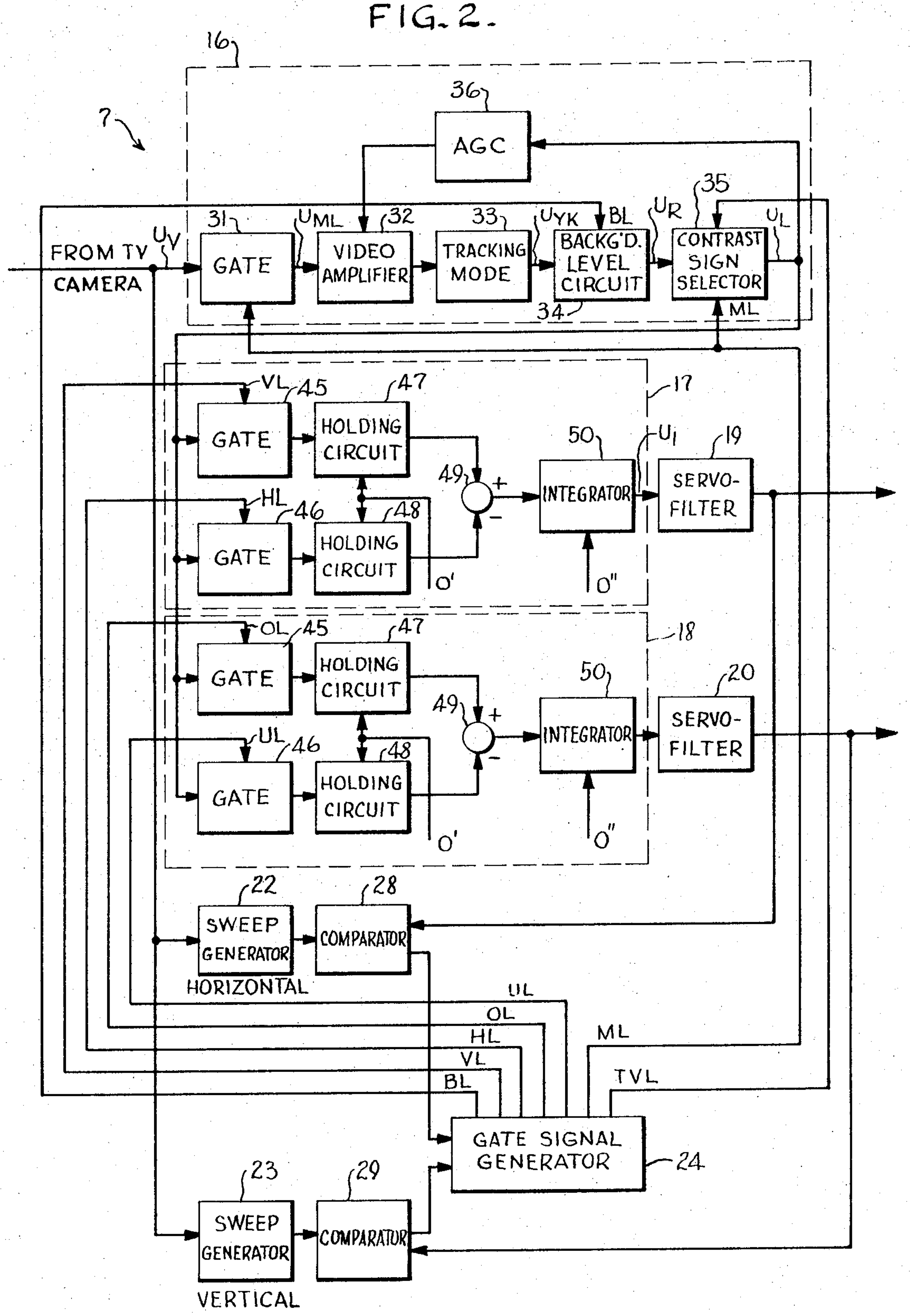
FIG. 2 is a block diagram of the video signal processing unit of the apparatus shown in FIG. 1.

The signal processing unit 7 comprises (see FIG. 2) a target signal circuit 16 into which the video signal $U_V$ from the camera is fed, a horizontal error detector circuit 17, a vertical error detector circuit 18, and gate signal generating means 24. The signal processing unit also comprises a pair of servo filters 19 and 20, one of which (designated 19) is connected with the horizontal error detector circuit 17 to receive therefrom a signal $U_I$ that corresponds to the horizontal displacement of the center of the target from the center of the electronic window, and the other of which receives from the vertical error detector circuit 18 a corresponding vertical error signal.

The incoming signal $U_V$ from the camera 5 is a voltage which varies with variations in luminosity that are detected as the field of view is scanned line by line. The $U_V$ signal also includes a synchronizing impulse dip that denotes the beginning of each line in accordance with the CCIR standard. In addition to being fed to the target signal circuit 16, the video signal $U_V$ is fed to horizontal and vertical sweep generators 22 and 23, respectively, both of which are started by the image snychronizing pulses in the video signal.

The output of the horizontal sweep generator 22 is fed to a comparator 28, which also receives an output from the horizontal servo filter 19; and the output of the comparator 28 is in turn fed to the gate signal generating means 24. In like manner, a comparator 29 receives inputs from the vertical sweep generator 23 and the vertical servo filter 20, and its output is fed to the gate signal generating means.

The gate signal generating means 24 generates gate signals in timed relation to the synchronization pulses. These gate signals define the various areas that comprise the background regions 14 and the electronic window 12, and in effect they define the times during each scan when scanning of said areas takes place. The following gate signals are produced:

ML: corresponding to analysis area, consisting of the electronic window 12 plus the background region or regions 14';

BL: corresponding to the background region or regions;

VL: corresponding to the left-hand half of the electronic window;

HL: corresponding to the right-hand half of the electronic window;

OL: corresponding to the upper half of the electronic window;

UL: corresponding to the lower half of the electronic window; and

TVL: corresponding to a selected central area within the electronic window, preferably smaller than the window but larger than the largest expectable target.

The target signal circuit 16 comprises a gate 31 which receives from the gate signal generator 24 a gate signal ML that corresponds to the analysis area, so that the video signal $U_{ML}$ that passes the gate 31 is that portion of each scan line signal $U_V$ that is within the analysis area. The signal $U_{ML}$ is amplified by a video amplifier 32, which is controlled by AGC means 36 in a feedback loop. From the amplifier 32 the amplified $U_{ML}$ signal, which is designated $U_{YK}$, passes through a tracking mode selector 33 to a background lever circuit 34, in which the signal from the background regions 14 is in effect filtered out of it, to obtain a signal $U_R$ that contains essentially only target information.

In general, the background level circuit calculates the mean value of the video signal level for the background regions 14, and subtracts this mean value from the signal $U_{ML}$ for the analysis area comprising the background regions plus the window. Subtracting the mean value of the background from the $U_{YK}$ signal sets the background level to substantially the zero level of the video signal. A feedback loop is employed in this subtraction process to achieve rapid and accurate subtraction with automatic correction for deviations from correct subtraction.

Figure 3:
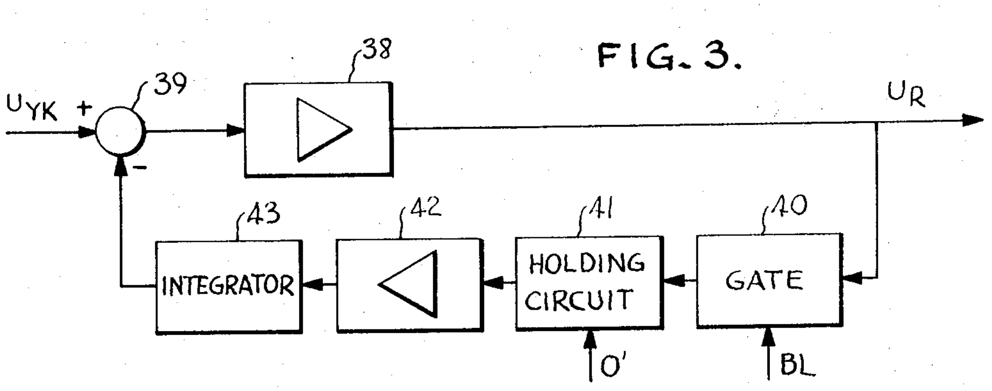
FIG. 3 is a block diagram illustrating in more detail a part of the apparatus schematically drawn in FIG. 2.

FIG. 3 illustrates in more detail the background level circuit 34. In that circuit an amplifier 38 has its input connected with a summation point 39 and has its output connected in a feedback circuit that comprises a gate 40, a holding circuit 41, a feedback amplifier 42 and an integrator 43. To control the gate 40 the gate signal generator 24 produces gate signals BL which correspond to only the background regions 14, and therefore the gate 40 passes into the feedback circuit amplified video signals $U_{BL}$ that correspond only to the background regions. From the gate 40, the $U_{BL}$ signals successively pass through the holding circuit 41, the feedback amplifier 42 and the integrator 43, to one input terminal of the summation point 39. That summation point has its other input terminal connected with the output of the video amplifier 32 to receive the $U_{YK}$ signal, and has its output connected with the amplifier 38. The holding circuit 41 is designed to be zeroed by a zeroing impulse 0′ for each scanning line, generated just before the beginning of each ML gate signal.

So long as there is a constant mean level for that portion of the signal $U_{YK}$ that corresponds to the background regions, and there is balance within the background circuit, the signal at the output of integrator 43 is constant and equal to said mean level. At the summation point 39 this mean level signal is subtracted from the incoming $U_{YK}$ signal, so that the signal $U_R$ that passes out of the summation point, as amplified by the amplifier 38, corresponds to the target signal referenced to the mean background level. Any change in the background level through the background regions of course effects a change in $U_{YK}$ and thus gives rise to an error signal in $U_R$, which is channeled to the holding circuit 41 and fed to the integrator 43 to cause the output signal from said integrator to be corrected in the direction to cause the mean signal level through the background regions to return to zero.

If the target is lighter than the background, the signal $U_R$ will be positive; if it is darker than the background, that signal will be negative; and if the immediate target area is partly lighter and partly darker, as where the target casts a shadow, the signal $U_R$ will be partly positive and partly negative. Returning now to FIG. 2, the function of the automatic contrast sign selector 35, which is described in more detail hereinafter, is to select that portion — either positive or negative — of the $U_R$ signal that is more likely to correspond to the target itself, to insure optimum tracking accuracy.

The output $U_L$ of the automatic contrast sign selector circuit is thus a signal that contains accurate information as to the position of the target within the field of view; hence the $U_L$ signal can be utilized directly by the error detector circuits 17 and 18 to which it is fed.

The error detector circuits are connected in parallel with the output of the target signal circuit, and their function is to determine the amount by which the target deviates from the center of the window and to issue to the servo filters 19 and 20 signals which correspond to that deviation in the horizontal and vertical directions, respectively.

The error signals are obtained by balancing the signal content of the target signal $U_L$ in two opposite halves of the electronic window 12. In the case of the horizontal error detector 17 the signal contents in the right and left halves of the window are balanced against one another; for the vertical error detector 18 the window is divided into top and bottom halves.

In the horizontal error detector 17 there are two gates 45 and 46 which are so connected to the gate signal generating means 24 as to respectively receive therefrom the VL and HL gate signals. Hence the gate 45 passes only that part of the $U_L$ signal that corresponds to the part of the target that is in the left-hand half of the window, while gate 46 passes only so much of the $U_L$ signal as represents the part of the target that is in the right-hand half of the window. Each gate 45, 46 passes the designated signal portion to a holding circuit 47, 48 respectively. Each holding circuit 47, 48 stores for the duration of the scanning of one line the value of that part of the $U_L$ signal that is fed to it. The outputs of the respective holding circuits 47 and 48 are fed to the opposite input terminals of a summation point 49, where they are balanced against one another. The output of the summation point 49 is thus a signal that corresponds to the difference between the contents of the left-hand and right-hand holding circuits 47 and 48. That output is integrated in an integrator 50, the output of which is a signal $U_I$ that corresponds to the horizontal deviation of the target from the center of the electronic window.

The $U_I$ signal is fed to the horizontal servo filter 19, and it, in turn, forwards a corresponding signal to the horizontal comparator to effect such change in the timing of the gate signals as may be necessary to center the window on the target.

The vertical error detector circuit 18, which sends its output to the vertical servo filter 20, operates in a generally similar manner to the horizontal error detector circuit.

Figure 4:
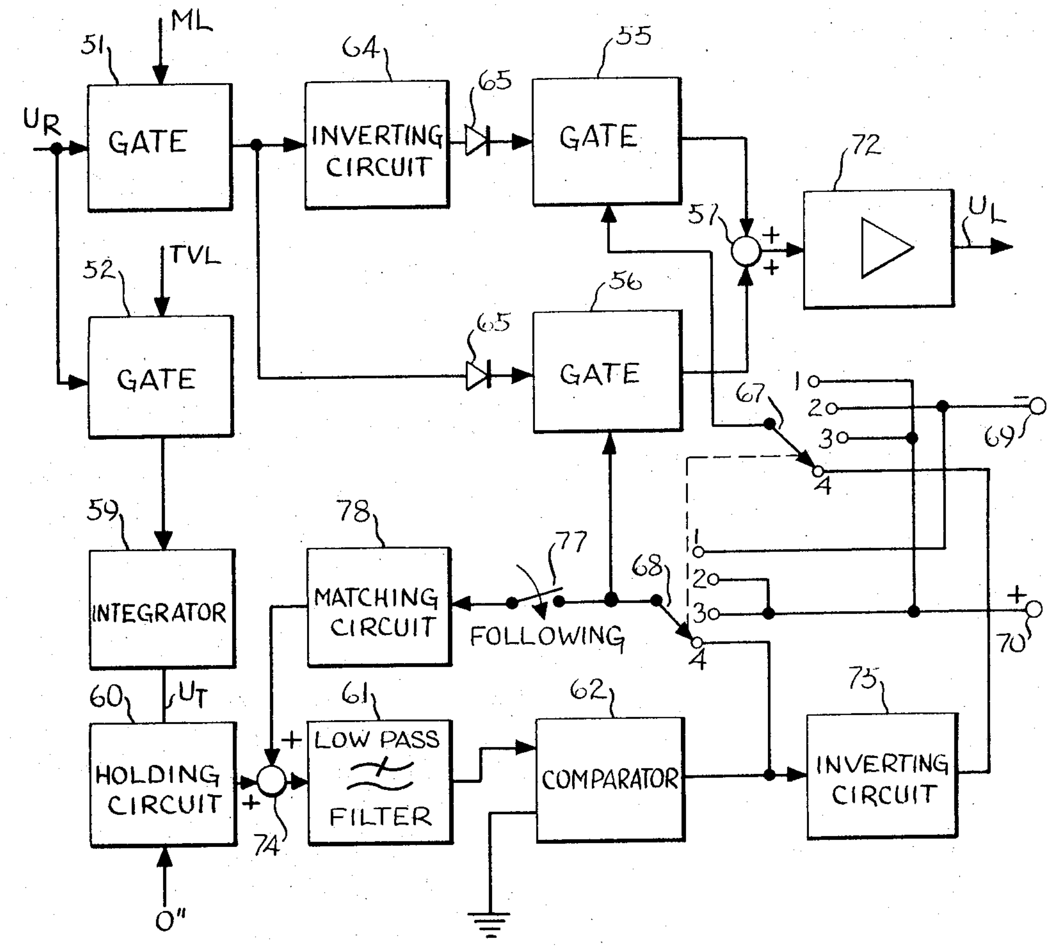
FIG. 4 is a block diagram illustrating in more detail another portion of the apparatus shown in FIG. 2, which portion particularly embodies the principles of the present invention.

Returning now to a more detailed consideration of the contrast sign selector circuit 35, which is particularly illustrated in FIG. 4, its purpose is to analyze the area of contrast that includes the target and to select for tracking the particular portion of that area that constitutes the target itself.

The $U_R$ signal from the background level circuit is fed to a pair of gates 51 and 52. The gate 51 admits the $U_R$ signal to a pair of segregating channels, one of which comprises a gate 55 and the other of which comprises a gate 56, and both of which terminate at a summation point 57. The gate 52 admits a portion of the $U_R$ signal to a third channel in which signals are generated for the control of the gates 55 and 56, and which third channel comprises an integrator 59, a holding circuit 60, a low pass filter 61 and a comparator 62.

The gate 51 that controls the above mentioned pair of segregating channels is controlled by signals ML from the gate signal generator means and therefore passes $U_R$ signals to said pair of channels during the interval of scan along each scanning line through the analysis area consisting of the electronic window 12 and the background region or regions 14. In each segregating channel there is a rectifier 65 connected just ahead of the gate 55 or 56 for that channel. In the segregating channel that includes the gate 55 there is an inverter 64 connected just ahead of the rectifier 65. Hence the signal that is fed to the gate 55 corresponds to only the negative component of the signal $U_R$, but inverted so as to have a positive sign, while the signal fed to the gate 56 corresponds to the positive component of the UR signal. The two segregating channels thus together constitute a full wave rectifier, but the gates 55 and 56 provide for selection of the particular component of the input $U_R$ signal that is to be used.

Each of the gates 55 and 56 is arranged to conduct when a gate signal of positive voltage is applied to it and to block in response to a gate signal of negative voltage.

A two-gang four-position selector switch, comprising mechanically linked movable contactors 67 and 68, provides for either manual or automatic selection of contrast sign. The movable contactor 67 is connected with the gate signal terminal of gate 55, while the contactor 68 is similarly connected with gate 56. The first three positions of the selector switch provide for manual selection, utilizing a source of negative voltage 69 and a source of positive voltage 70 for gate signals. Of the stationary contacts with which the movable contactor 67 cooperates, Nos. 1 and 3 are connected with the positive voltage source 70, while No. 2 is connected with the negative voltage source 69. Of the stationary contacts which movable contactor 68 can engage, No. 1 is connected with the negative voltage source 69 and Nos. 2 and 3 are connected with the positive voltage source 70. The No. 4 stationary contact of each switch element as a connection with the gate signal generating channel, as described hereinafter, to provide for automatic sign selection.

In the No. 1 position of the selector switch a positive gate signal voltage is applied to gate 55 and a negative gate signal voltage is applied to gate 56; hence gate 55 conducts and gate 56 blocks. Therefore only the negative component of the $U_R$ signal is passed to the summation point 57, whence it is conducted to an amplifier 72, the output of which constitutes the above mentioned $U_L$ signal that is fed to the error detector circuits. Thus in the first position of the selector switch manual selection is made of only those (negative) portions of the filtered video signal that correspond to lesser luminosity than the background; and this switch position would be used for manual selection of a target known to be darker than the background, to prevent tracking on a directly adjacent area lighter than the background.

The second switch position is used for the opposite situation, that is, where the target is more luminous than the background and tracking is to be prevented on a darker adjacent area. In the second switch position the gate 55 blocks (because of the negative gate voltage applied to it through movable contactor 67), gate 56 conducts, and consequently only the positive component of the $U_R$ signal is fed to summation point 57 and thence to amplifier 72.

In the third switch position, both of gates 55 and 56 are conductive (positive gate voltage applied to both), and consequently both the darker and the lighter areas of the target are used in tracking. This position would be used where the target itself is known to comprise areas of both positive and negative contrast.

In the fourth position of the two-gang switch the apparatus makes an automatic selection of that portion of the target area contrast which is most likely to correspond to the target itself, utilizing for this purpose the gate signals that are generated in the third channel.

The gate 52 that controls the third channel is rendered conductive by a signal TVL from the gate signal generator. The TVL gate signal causes only so much of the $U_R$ video signal to be passed as corresponds to a selected central area of the electronic window that is preferably smaller than the window but larger than the area of the largest expectable target. This portion of the $U_R$ signal is fed to the integrator 59. The output of the integrator is a signal designated $U_T$ that has a value corresponding to the signal content of $U_R$ through the TVL area, and it is fed to the holding circuit 60, where it is stored briefly. The holding circuit is zeroed by a zeroing impulse 0'' for each scanning frame. The output of the holding circuit, which is a mean time value of $U_T$, is fed to one input terminal of a summation point 74. The other input terminal of the summation point is connected with a feedback loop described hereinafter, and the output of the summation point is fed to the low pass filter 61, which filters out signal variations of short duration and feeds the filtered signal to the comparator 62.

The comparator in effect compares the incoming signal with a zero voltage ground potential and produces a steady positive output voltage if its input signal is positive and a steady negative output voltage if its input voltage is negative. The output of the comparator is fed directly to the No. 4 fixed contact of the selector switch element comprising movable contactor 68, and through the latter it controls the gate 56 when the selector switch is in the "automatic" position. The output of the comparator 62 is also fed through an inverter 75 to the No. 4 contact that cooperates with the switch element comprising movable contactor 67, and through the latter to gate 55. It will be apparent that when the selector switch is in the "automatic" position, one of the gates 55, 56 receives a gating signal of one sign while the other, by reason of the inverter 75, receives a gating signal of the opposite sign; hence signals from only one or the other of the segregating channels will be fed to the amplifier 72 during automatic operation, depending upon whether the apparatus has selected positive or negative contrast. A positive output voltage from comparator 62 causes positive contrast to be selected. The type of contrast that is selected is that for which there is the greatest signal content, as determined by the comparator in its cooperation with the other units comprising the gate signal generating channel.

The above mentioned feedback loop is connected with the movable contactor 68 and comprises a circuit breaker 77 and a matching unit 78, in series. With the circuit breaker closed and the selector switch in its "automatic" position, the matching circuit 78 is connected with the output of the comparator 62 to return a certain proportion of the output voltage from the comparator to the summation point 74 and thus to the low pass filter 61. The low pass filter thus receives an input feedback voltage which differs by a constant value from the output of holding circuit 60. The feedback loop cooperates with the units of the third channel to prevent a reselection of contrast if a transient appears in that channel which is of opposite sign to the prevailing contrast value; and in case of a more prolonged interference a preference is given to the previously prevailing contrast sign. Where the target contrast sign changes relative to the background, as by reason of a substantial change in background luminosity, it will be evident that the apparatus automatically accommodates such change by revising its contrast sign selection.

During manual tracking selection, the feedback loop is not connected with the gate signal voltage sources 69 and 70, because the circuit breaker 77 is then open. That circuit breaker closes after tracking on the selected target has been established in the "automatic" mode. By keeping the circuit breaker open until after lock-on in the "automatic" mode rapid selection of the sign of contrast can be effected. If the circuit breaker were closed during lock-on, it might not be possible to obtain correct sign selection for a small target with low contrast, owing to the biasing function of the feedback loop.

From the foregoing description taken with the accompanying drawings it will be apparent that this invention provides a method and means for automatically discriminating between a target being tracked and areas of contrast (such as shadows) that are contiguous to the target and influenced by it; and also provides for automatic tracking on a target that undergoes changes in contrast with its background.

Those skilled in the art will appreciate that the invention can be embodied in forms other than as herein disclosed for purposes of illustration.

The invention is defined by the following claims:

1. The method of video tracking of a target that contrasts with its background, which method comprises generating video signals that vary with variations in luminosity detected during line-by-line scanning of a field of view that includes the target, generating other signals in timed relation to scanning that define an electronic window covering a small area within the field of view, and, by reference to the video signals that correspond to the target, moving the electronic window to keep it centered on the target, characterized by the following steps by which accuracy in tracking on the target itself is insured, irrespective of whether the target has a greater or lesser luminosity than its background and irrespective of the influence of the target upon luminosity of its adjacent background, as by its casting of shadows:

A. segregating from the video signals for the total field of view those portions corresponding to an area within the electronic window that includes the target;

B. by reference to a signal which represents a generalization of the level of background luminosity, segregating those components of the video signal corresponding to said area which are above said level from those components of said video signal which are below said level;

C. comparing the magnitudes of signal content of the thus segregated video signal components; and D. selecting and utilizing for control of movement of the electronic window the thus segregated video signal component having the greater magnitude of signal content.

2. The method of claim 1 further characterized by:

E. delivering each of said segregated components of the video signal to its own gate;

F. generating a substantially steady gate signal that corresponds to the segregated video signal component having the higher signal content; and G. applying said gate signal to the gate for said component of the video signal.

3. The method of claim 2 wherein said video signal components respectively comprise positive and negative voltage, further characterized by:

H. rectifying said video signal portion before feeding it to one of the gates, to segregate one of said components; and I. simultaneously inverting and then rectifying said video signal portion before feeding it to the other of said gates to segregate the other of said signal components.

4. The method of claim 3, further characterized by the comparison of the magnitudes of signal content of the video signal components comprising:

J. simultaneously with delivery of said signal components to said gates, integrating said portion of the video signal and temporarily storing the integrated signal portion;

K. comparing the temporarily stored integrated signal portion with a reference level, and issuing a substantially steady output that corresponds in sign to the relationship of the stored integrated signal portion to said reference level;

L. feeding said substantially steady output to one of said gates as the gate signal therefor; and M. inverting said substantially steady output and feeding it in inverted form to the other of said gates as the gate signal therefor.

5. Apparatus for video tracking of a target that contrasts with its background, and which apparatus is of the type that comprises a video signal generator that scans a field of view line-by-line to generate a video signal that varies with variations in luminosity detected during such scanning, means for generating other signals in timed relation to scanning that define an electronic window within the field of view, and means responsive to signals corresponding to an area of substantial contrast within the window, which area signifies a target to be tracked, for so controlling the window as to maintain it centered on the target, said apparatus being characterized by:

A. means comprising a gate for passing only selected portions of the video signal, corresponding to an area within the electronic window;

B. means for processing the video signal portions that are passed through said gate to adjust their level in relation to a level that corresponds to a generalization of areas of the field of view other than the target, so that such passed video signals have components of one sign that correspond to portions of the target having greater luminosity than the background and have components of the opposite sign corresponding to target portions of lesser luminosity than the background;

C. means defining a pair of segregation channels connected with said gate through which said selected video signal portions can be sent simultaneously,
   1. one of said channels comprising a signal inverter, and
   2. both of said channels comprising rectifier means, so that each of said channels can pass one of said video signal components but said components issue from their respective channels with the same sign;

D. a pair of gate means, one connected in each of said segregation channels, each adapted to pass video signal components under the influence of a gating signal of one sign and to block such components under the influence of a gating signal of the opposite sign;

E. means defining a third signal channel connected to receive said video signal components with their original signs and which comprises
   1. means for integrating video signal components, and
   2. comparator means for producing a substantially steady gate signal of one sign in response to integrated signal components of said one sign and of the opposite sign in response to integrated signal components of the opposite sign, the gate signal thus produced during any time interval corresponding in sign to the video signal component of greater magnitude;

F. means for conducting gate signals from said third channel to one of said pair of gate means; and G. means comprising an inverter for conducting gate signals from said third channel to the other of said pair of gate means, said inverter providing for one of said pair of gate means to be blocking while the other is conducting signals, the gate means that is conducting being the one associated with the one of said pair of channels carrying the video signal component of greater magnitude.

6. The apparatus of claim 5, further characterized by: said third signal channel comprising
   1. a feedback loop and
   2. means associated with said feedback loop for delaying for a predetermined interval any change in sign in said integrated video signal components.

7. The apparatus of claim 5, further characterized by: said third signal channel comprising a low pass filter connected between said integrating means and said comparator means for preventing changed gate signals from being produced in response to transient changes in sign of the integrated video signal components.

* * * * *